(12) United States Patent
Phillips et al.

(10) Patent No.: US 9,117,384 B2
(45) Date of Patent: Aug. 25, 2015

(54) SYSTEM AND METHOD FOR BENDABLE DISPLAY

(75) Inventors: W Garland Phillips, Barrington, IL (US); Bashar Jano, Algonquin, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 1066 days.

(21) Appl. No.: 13/051,470

(22) Filed: Mar. 18, 2011

(65) Prior Publication Data

US 2012/0235893 A1    Sep. 20, 2012

(51) Int. Cl.
*G09G 3/00* (2006.01)
*G06F 3/01* (2006.01)
*G06F 3/041* (2006.01)
*G09G 3/20* (2006.01)

(52) U.S. Cl.
CPC ............... *G09G 3/003* (2013.01); *G06F 3/012* (2013.01); *G06F 3/013* (2013.01); *G06F 3/0418* (2013.01); *G09G 3/20* (2013.01); *G06F 2203/04102* (2013.01); *G09G 2380/02* (2013.01)

(58) Field of Classification Search
CPC ............... G09G 3/20; G09G 2380/02; G09G 2320/0261
USPC .................................. 345/156, 618
See application file for complete search history.

(56) References Cited

U.S. PATENT DOCUMENTS

| | | | |
|---|---|---|---|
| 6,297,838 B1 | 10/2001 | Chang et al. | |
| 6,943,773 B2 | 9/2005 | Wong et al. | |
| 7,109,967 B2 | 9/2006 | Hioki et al. | |
| 7,148,944 B2 | 12/2006 | Kinoshita et al. | |
| 7,298,365 B2 | 11/2007 | Moriyama | |
| 7,394,452 B2 | 7/2008 | Wong et al. | |
| 7,443,380 B2 | 10/2008 | Nozawa | |
| 7,558,057 B1 | 7/2009 | Naksen et al. | |
| 7,564,436 B2 | 7/2009 | Huitema et al. | |
| 7,714,801 B2 | 5/2010 | Kimmel | |
| 8,543,166 B2 * | 9/2013 | Choi et al. | ..................... 455/566 |
| 2003/0231144 A1 | 12/2003 | Cho et al. | |
| 2004/0008191 A1 | 1/2004 | Poupyrev et al. | |
| 2004/0252913 A1 | 12/2004 | Ahn | |

(Continued)

FOREIGN PATENT DOCUMENTS

| | | |
|---|---|---|
| CA | 2771508 A1 | 9/2012 |
| CA | 2771849 A1 | 9/2012 |

(Continued)

OTHER PUBLICATIONS

"Canadian Application Serial No. 2,771,849, Office Action mailed Dec. 18, 2013", 3 pgs.

(Continued)

*Primary Examiner* — Amare Mengistu
*Assistant Examiner* — Joseph G Rodriguez
(74) *Attorney, Agent, or Firm* — Jeffrey N. Giunta; Fleit Gibbons Gutman Bongini & Bianco P.L.

(57) ABSTRACT

Systems, methods and apparatus are described for displaying visual information on a deformable display device, and for compensating for distortion of images of the visual information that results from the deformation of the display device and the viewing orientation of a viewer of the display device, or for improving or enhancing the displayed visual information in response to the deformation of the display device and the viewing position of the viewer.

23 Claims, 8 Drawing Sheets

(56) References Cited

U.S. PATENT DOCUMENTS

| | | | |
|---|---|---|---|
| 2005/0104848 A1 | 5/2005 | Yamaguchi et al. | |
| 2005/0140646 A1 | 6/2005 | Nozawa | |
| 2006/0077544 A1 | 4/2006 | Stark | |
| 2007/0085845 A1 | 4/2007 | Kikuchi et al. | |
| 2007/0097014 A1 | 5/2007 | Solomon et al. | |
| 2007/0164923 A1 | 7/2007 | Kanai et al. | |
| 2007/0205997 A1 | 9/2007 | Lieshout et al. | |
| 2007/0228952 A1 | 10/2007 | Kwon et al. | |
| 2009/0232969 A1 | 9/2009 | Hayton et al. | |
| 2009/0244267 A1* | 10/2009 | Yuan et al. | 348/51 |
| 2009/0295943 A1 | 12/2009 | Kim et al. | |
| 2010/0011291 A1 | 1/2010 | Nurmi | |
| 2010/0053073 A1 | 3/2010 | Cohen et al. | |
| 2010/0053074 A1 | 3/2010 | Cohen et al. | |
| 2010/0053075 A1 | 3/2010 | Cohen et al. | |
| 2010/0053076 A1 | 3/2010 | Cohen et al. | |
| 2010/0056223 A1* | 3/2010 | Choi et al. | 455/566 |
| 2010/0060563 A1 | 3/2010 | Hayton et al. | |
| 2010/0060667 A1 | 3/2010 | Chen et al. | |
| 2010/0066685 A1 | 3/2010 | Cain et al. | |
| 2010/0085301 A1 | 4/2010 | Cohen et al. | |
| 2010/0103123 A1 | 4/2010 | Cohen et al. | |
| 2010/0117954 A1 | 5/2010 | Cohen et al. | |
| 2010/0117955 A1 | 5/2010 | Cohen et al. | |
| 2010/0117975 A1 | 5/2010 | Cho | |
| 2010/0124879 A1 | 5/2010 | Cohen et al. | |
| 2010/0141605 A1 | 6/2010 | Kang et al. | |
| 2010/0164888 A1* | 7/2010 | Okumura et al. | 345/173 |
| 2010/0164973 A1 | 7/2010 | Huitema et al. | |
| 2010/0253766 A1 | 10/2010 | Mann et al. | |
| 2011/0057873 A1 | 3/2011 | Geissler et al. | |
| 2012/0092363 A1* | 4/2012 | Kim et al. | 345/618 |
| 2012/0235893 A1* | 9/2012 | Phillips et al. | 345/156 |
| 2012/0235894 A1 | 9/2012 | Phillips | |
| 2013/0329422 A1* | 12/2013 | Park et al. | 362/233 |

FOREIGN PATENT DOCUMENTS

| | | | | |
|---|---|---|---|---|
| CN | 101910966 A | | 12/2010 | |
| CN | 102723058 A | | 10/2012 | |
| EP | 1785805 A2 | | 5/2007 | |
| EP | 1967937 A1 | | 9/2008 | |
| EP | 2073092 B1 | | 5/2010 | |
| EP | 2192750 A2 | | 6/2010 | |
| EP | 2005894 A1 | | 9/2012 | |
| EP | 2500898 A1 | | 9/2012 | |
| GB | 2456512 A | | 7/2009 | |
| JP | 11272205 A | | 8/1999 | |
| JP | 2006243621 A | | 9/2006 | |
| JP | 2008151995 A | | 7/2008 | |
| JP | 2010211211 A | | 9/2010 | |
| JP | 2012198541 A | | 10/2012 | |
| KR | 1020100100044 | * | 10/2010 | G06T 5/00 |
| KR | 1020120106662 A | | 9/2012 | |
| WO | WO-03050963 A1 | | 6/2003 | |
| WO | WO-2008108645 A1 | | 9/2008 | |
| WO | WO-2010019466 A1 | | 2/2010 | |

OTHER PUBLICATIONS

"European Application Serial No. 11158916.4, Office Action mailed May 2, 2013", 12 pgs.
"European Application Serial No. 11158916.4, Response filed Nov. 6, 2013 to Office Action mailed May 2, 2013", 6 pgs.
"European Application Serial No. 11158916.4, European Search Report mailed May 27, 2011", 11 pgs.
"European Application Serial No. 11158916.4, Response filed Aug. 2, 2012 to Search Report mailed May 27, 2011", 13 pgs.
"OOOii Open Interface Interactive Advertising", [Online]. Retrieved from the Internet: <URL: http://www.ooo-ii.com/category/responsive/head-tracking>, (Accessed on Jul. 14, 2011), 2 pgs.
"The Future of User Interfaces", [Online]. Retrieved from the Internet: <URL: Downloaded from http://sixrevisions.com/user-interface/the-future-of-user-interfaces/>, (Accessed on Jul. 14, 2011), 21 pgs.
"5" Folding Screen could Help take smartphones to the next level.", [Online]. Retrieved from the Internet: <URL: http://www.umpcportal.com/2008/11/5-folding-screen-could-help-take-smartphones-to-the-next-level/>, (Nov. 21, 2008), 6 pgs.
"U.S. Appl. No. 13/051,547, Advisory Action mailed Aug. 5, 2013", 3 pgs.
"U.S. Appl. No. 13/051,547, Final Office Action mailed May 15, 2013", 12 pgs.
"U.S. Appl. No. 13/051,547, Non Final Office Action mailed May 27, 2014", 15 pgs.
"U.S. Appl. No. 13/051,547, Non Final Office Action mailed Aug. 16, 2012", 9 pgs.
"U.S. Appl. No. 13/051,547, Non Final Office Action mailed Oct. 17, 2013", 13 pgs.
"U.S. Appl. No. 13/051,547, Response filed Jan. 16, 2014 to Non Final Office Action mailed Oct. 17, 2013", 15 pgs.
"U.S. Appl. No. 13/051,547, Response filed Jul. 12, 2013 to Final Office Action mailed May 15, 2013", 12 pgs.
"U.S. Appl. No. 13/051,547, Response filed Dec. 17, 2012 to Non-Final Office Action mailed Aug. 16, 2012", 11 pgs.
"U.S. Appl. No. 13/051,547, Response mailed Jan. 16, 2014 to Non Final Office Action mailed Oct. 17, 2013", 15 pgs.
"Canadian Application Serial No. 2,771,508, Office Action mailed Dec. 19, 2013", 3 pgs.
"Chinese Application Serial No. 201210072754.9, Preliminary Amendment filed Feb. 22, 2013", w/English Claims, 8 pgs.
"European Application Serial No. 11158915.6, Extended European Search mailed Aug. 17, 2011", 8 pgs.
"European Application Serial No. 11158915.6, Response filed Jul. 20, 2012 to Extended European Search Report mailed Aug. 17, 2011", 11 pgs.
"HP's new foldable, wrappable, moldable plastic displays", [Online]. Retrieved from the Internet: <URL: http://www.techlahore.com/2008/12/11/hps-new-foldable-wrappable-moldable-plastic-displays/>, (Dec. 11, 2008), 7 pgs.
"Japanese Application Serial No. 2012-062080, Final Office Action mailed Jul. 11, 2013", w/English Translation, 4 pgs.
"Japanese Application Serial No. 2012-062080, Non Final Office Action dated Mar. 12, 2013", w/English Translation, 4 pgs.
"Japanese Application Serial No. 2012-062080, Response filed Jun. 3, 2013 to Non Final Office Action dated Mar. 12, 2013", W/English Claims, 10 pgs.
"Korean Application Serial No. 10-2012-0027948, Office Action mailed Jul. 1, 2013", w/English Translation, 9 pgs.
"Korean Application Serial No. 10-2012-0027948, Response filed Sep. 30, 2013 to Non Final Office Action dated Jul. 1, 2013", With English Claims, 20.
"Nokia Moves Ahead on Flexible Phone Displays", http://gorumors.com/nokia-moves-ahead-on-flexible-phone-displays/275279, (Jan. 18, 2010), 2 pgs.
"palmOne patents handheld with flexible dual-sided display", [Online]. Retrieved from the Internet: <URL: http://www.engadget.com/2005/02/08/palmone-patents-handheld-with-flexible-dual-sided-display/>, (Feb. 8, 2005), 2 pgs.
"Plastic Logic", [Online]. Retrieved from the Internet: <URL: http://www.plasticlogic.com/ereader/index.php>, (Archived Jul. 16, 2010), 2 pgs.
"Polymer Vision's Readius rollable display gets face time", [Online]. Retrieved from the Internet: <URL: http://www.engadget.com/2007/02/19/polymer-visions-readius-rollable-display-gets-face-time/>, (Feb. 19, 2007), 3 pgs.
"QUE ProReader", [Online]. Retrieved from the Internet: <URL: http://www.que.com>, (Archived Jul. 1, 2010), 1 pg.
"The Digital Reader from Sony", [Online]. Retrieved from the Internet: <URL: http://ebookstore.sony.com/reader/>, (Archived Aug. 25, 2010), 3 pgs.
Perton, Marc, "Flexible OLED display prototype demonstrated", [Online]. Retrieved from the Internet: <URL: http://www.engadget.com/2006/02/07/flexible-oled-display-prototype-demonstrated/>, (Feb. 7, 2006), 2 pgs.
Rankin, Mike, "Is This What a Kindle Killer Looks Like?", [Online]. Retrieved from the Internet: <URL: http://publicious.net/2009/

(56) References Cited

OTHER PUBLICATIONS

02/11/is-this-what-a-kindle-killer-looks-like/>, (Feb. 11, 2009), 6 pgs.

"U.S. Appl. No. 13/051,547, Response filed Aug. 22, 2014 to Non Final Office Action mailed May 27, 2014", 11 pgs.

"Canadian Application Serial No. 2,771,508, Response filed Jun. 16, 2014 to Office Action mailed Dec. 19, 2013", 11 pgs.

"Chinese Application Serial No. 201210072754.9, Office Action mailed Jun. 5, 2014", w/English Translation, 11 pgs.

"Chinese Application Serial No. 201210072754.9, Response filed Oct. 20, 2014 to Office Action mailed Jun. 5, 2014", w/English Claims, 11 pgs.

"Korean Application Serial No. 10-2012-0027948, Notice of Final Rejection mailed Dec. 17, 2013", w/English Translation, 8 pgs.

\* cited by examiner

SYSTEM AND METHOD FOR BENDABLE DISPLAY

TECHNICAL FIELD

This technology relates generally to display devices and, more particularly, to bendable or flexible display devices used for display of visual information.

BACKGROUND

Bendable or flexible displays are now becoming available for use in displaying visual information, such as text, video, or graphics. The availability of these bendable displays is providing opportunities for innovative new display systems that can offer many advantages over conventional rigid displays.

BRIEF DESCRIPTION OF THE DRAWINGS

The accompanying figures, in which like reference numerals refer to identical or functionally-similar elements throughout the separate views and which are incorporated in and form part of the specification, further illustrate the present technology and, together with the detailed description of the technology, serve to explain the principles of the present technology.

DETAILED DESCRIPTION

Described below are techniques for displaying visual information (such as, but not limited to, text, video, pictures, two- or three-dimensional images, icons, cursors or graphics) on a deformable display device, such as a bendable or flexible display. It has been discovered that deforming the deformable display device (such as by bending, twisting, or otherwise changing the shape from the default shape of the deformable display device) can produce an image of the visual information that is distorted. In other words, the image that a viewer may see of the visual information may seem to that viewer to be distorted due to the deformation of the deformable display device. Further, it has been discovered that the distortion may seem to be more pronounced depending upon the perspective (or viewpoint) of a viewer. The distortion may result in one or more undesirable effects. In the case of image data that includes text, for example, the deformation may make the text harder for the viewer to read. In the case of image data that includes graphical content (such as drawings, still pictures, or video), the deformation may make the graphical presentation unpleasant, disorienting, or inclined to give a false impression. Generally speaking, the techniques described below compensate for the distortion and thereby reduce the undesirable effects. In some embodiments, the techniques take into account information about the deformation of the display device and the viewing orientation of a viewer of the display device.

The following description should be read with reference to the drawings, in which like elements in different drawings are numbered in like fashion. The drawings, which are not necessarily to scale, depict illustrative embodiments and are not intended to limit the scope of the claims appended hereto. Although examples of various steps are illustrated in the various views, many of the examples provided have suitable alternatives that can be utilized. Moreover, while several illustrative applications are described throughout the disclosure it should be understood that the present technology could be employed in other applications where bendable display technology is of value.

Figure 1:
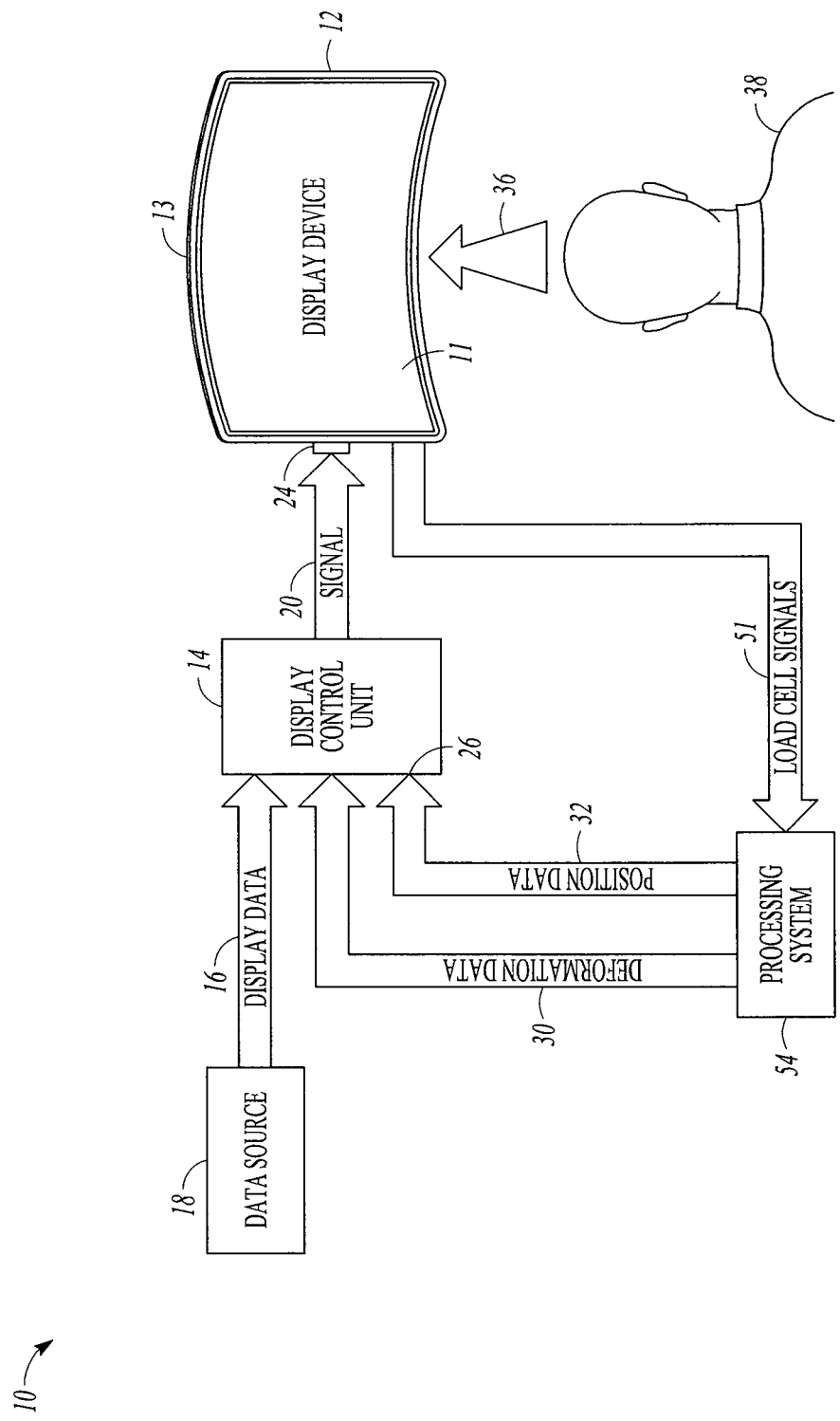
FIG. 1 is a schematic illustration of a display system according to one example embodiment of the present technology.

Referring now to FIG. 1, there is schematically illustrated a display system 10 including a display device 12 with a display surface 11. Although depicted as a stand-alone device, display device 12 may be a component of another machine (which may include a device or a system), such as a smart phone, mobile phone, portable computer (such as a laptop or notebook computer), computing tablet, remote control, reading device or other portable electronic device. Display device 12 is a deformable display device. Although the default shape of display device 12 may be substantially planar, display device 12 may be bendable or deformable to provide for bending or contouring 13 of the display. Deformation of the display device 12 may be performed by any agent (for example, by actions of a person or by mechanical action such as by a machine, or by a combination thereof). A display control unit 14 receives image display data 16, which may, for example, take the form of text data, graphical data, non-graphical data or other data used to produce or specify visual information, from a data source 18 and produces (or generates as an output) one or more image control signals 20 (for example, video signals) as a function of the image display data, display deformation data 30 and viewer position data 32, for application to one or more signal inputs 24 (for example, video signal inputs) of display device 12. In conventional terms, the image display data 16 is adapted to cause the display control unit 14 and display device 12, when in a default or expected configuration, such as a planar configuration, to display visual information and/or an image in an undistorted form. It shall be understood, however, that the default or expected configuration of the display device 12 may be non-planar, such that changes from the non-planar state may cause distortion that can be corrected for. Display control unit 14 receives the image display data 16 as an input and generates image control signals 20, which control the visual information displayed on display device 12, as an output. According to one example embodiment, display device 12 may be constructed of separate components such as a display unit containing display elements used to produce images of visual information, perceptible by a viewer, and display circuit components, or may be an integrated unit of display elements and complementary components. According to other example embodiments, the image control signals 20 may be analog or digital, for example but are not limited to component video, digital visual interface (DVI), video graphics array (VGA) or high-definition multimedia interface (HDMI) video control signals.

As further illustrated in FIG. 1, display control unit 14 includes at least one additional input 26 to receive data from bend/view position processing system 54, including display deformation data 30 and viewer position data 32 (which will be described in more detail below) representing and being a function of, respectively, the bends or contours 13 of display device 12 and the viewing perspective 36 of a viewer 38 of the display device 12. According to one example embodiment, the viewing perspective of a viewer is determined from one or both of the viewer's position or viewer's viewing orientation, or from any other indication of the viewer's perspective. Bend/view processing system 54, shown also in FIG. 4, receives load cell signals 51 from display device 12, and viewer position information from a camera or cameras 120 (see FIG. 4), serving in one example embodiment as a viewer position detector (a detector of viewer position or orientation relative to (or with respect to) a reference such as the display device 12), and uses this input to generate or produce the display deformation data 30 and viewer position data 32. As described below, display control unit 14 generates control signals 20 as a function of the undistorted image display data 16, the perspective 36 of the viewer 38, and the deformation of the display device 12. In circumstances in which the perspective 36 of the viewer 38 and the deformation of the display device 12 would result in the viewer 38 viewing an image with little or no distortion, the display control unit 14 may produce an image based upon the undistorted image display data 16, with little or no adjustment thereto. In circumstances in which the perspective 36 of the viewer 38 and the deformation of the display device 12 would result in the viewer 38 viewing an image with significant distortion, however, the display control unit 14 may produce an image based upon the undistorted image display data 16, with adjustments to the image as a function of the perspective 36 of the viewer 38 and the deformation of the display device 12. The adjustments compensate for some or all of the distortion that the viewer would otherwise experience.

According to one embodiment, display control unit 14 takes the form of an integrated circuit responsible for generating the timing of control signals 20, such as, for example, horizontal and vertical synchronization signals, and a blanking interval signal. According to one example embodiment, the data source 18 is a video random access memory (RAM) or other storage device, such as, but not limited to, a magnetic or optical storage device, or a processing device. According to still another example embodiment, display control unit 14 is a video display processor (VDP). According to another example embodiment, the display control unit 14 is a video display controller that may take the form of a video shifter, a cathode ray tube controller (CRTC), a video interface controller, or a video code processor. According to still other example embodiments, the display control unit 14 may be mounted on a central processing unit (CPU) motherboard or integrated into a microprocessor chip.

Figure 2:
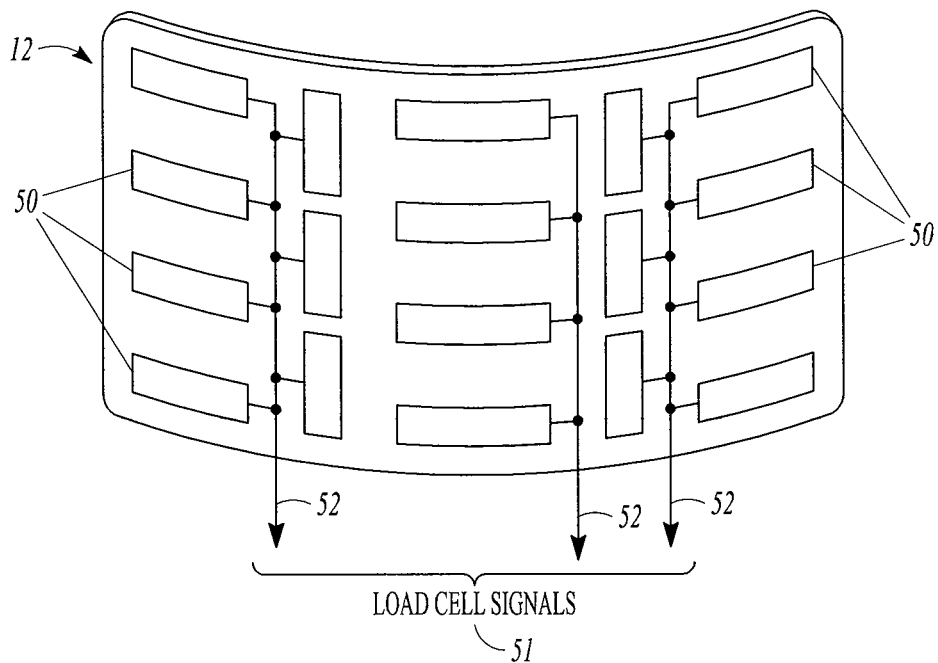
FIG. 2 illustrates a bendable display device with bend sensors, according to one example embodiment of the present technology.

FIG. 2 illustrates a bendable display device with bend sensors, according to one example embodiment of the present technology. As illustrated schematically in FIG. 2, the bend or deformation properties or characteristics of display device 12 may be obtained using one or more deformation detection devices. In general, a deformation detection device produces or generates one or more deformation detection signals as a function of the deformation of the deformable display device 12. As a result, the deformation detection signals are indicative of the deformation (or the deformation properties) of the deformable display device (e.g., where a deformation is and the degree thereof). An example of a deformation detection device may take the form of load cells 50 mounted or integrated with display device 12. According to one example embodiment, load cells 50 are bonded onto display device 12 such that bending of the display device 12 produces corresponding analog (or, in an alternate embodiment, digital) electrical load cell signals 51, serving as deformation detection signals, in one or more of the load cells 50. The signals 51 generated from load cells 50, according to one example embodiment, are proportional to the amount of bend in the display device 12; in other words, the signals 51 are generated from load cells 50 in response to (or as a function of) a deformation in the display device 12. In general, the signals 51 may convey information about where deformations occur in the display device 12, what kind of deformations they are (e.g., concave or convex), and the degree of the deformations. The signals from load cells 50 are conveyed on signal paths 52 to a bend/view position processing system 54 taking, for example, the form of a programmable computer or other electronic device capable of interpreting the signals to generate display deformation data 30. According to one embodiment, if the signals 51 are analog signals, they are converted to digital data and processed in bend/view position processing system 54 to determine the location of bends in the display device 12. Alternatively, separate analog to digital circuits may be employed to digitize the signals 51, if in analog form, prior to delivery to bend/view position processing system 54. As noted above, the embodiment depicted in FIG. 2 is an example, and the concepts described may be applied in systems in which the deformation of the display device is monitored by apparatus external to the display device, and the signals 51 generated as a function of the deformation in the display device 12 are generated by a component other than the display device 12 itself.

According to another example embodiment, at least some of load cells 50 are oriented fully or partially transversely to one another in order that bends and contours in display device 12 can be ascertained from the signals 51. In one embodiment, using the relative magnitude of the signals from load cells 50 and the location of the respective load cells 50 on the display 12, the bend/view position processing system 54 determines the approximate or exact deformation of display device 12 in three dimensions, and records bend or contour data representing the actual bends or contours in a storage device or memory on or off-board the bend/view position processing system 54. According to still other example embodiments (not shown), the bend or contour of display device 12 may be determined using other deformation detection devices or means, such as from images of the display device captured from one or more cameras, wherein the images are processed in order to determine the deformation of the display device 12.

Figure 3:
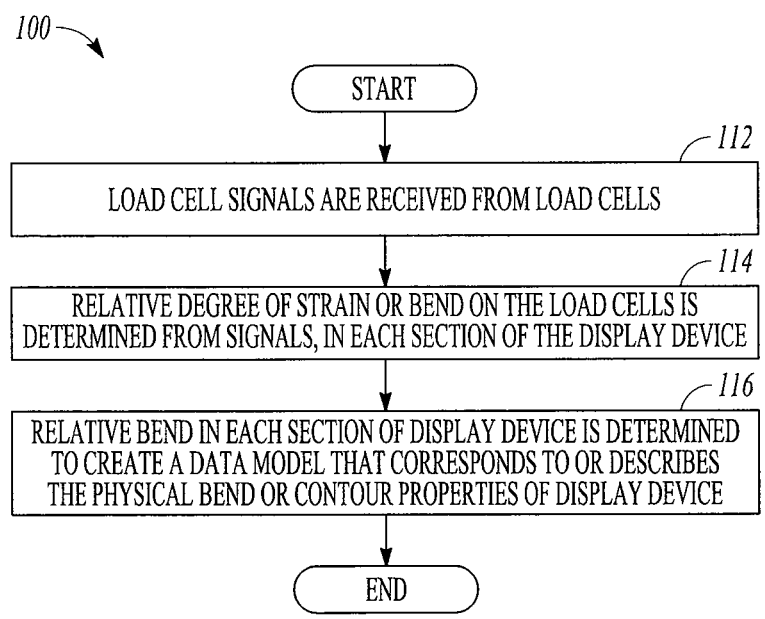
FIG. 3 is a flowchart illustrating an example method and computer program suitable for determining the deformation of a display device, according to one example embodiment of the present technology.

Referring now to the flowchart of FIG. 3, there is illustrated a method that may be embodied as a computer program 100, illustrating an example computer program suitable for determining the deformation, resulting in bends or contours, of the display device 12. According to program 100, load cell signals 51 are received from load cells 50 (112). Using stored data indicative of the locations of each of load cells 50 on device 12, computer program 100 determines the relative degree of strain or bend on the load cells 50, from signals 51, in each section of the display device 12 (114). Using a set of predetermined coefficients indicative of a correlation between load cell signals and respective physical display bending or deformation characteristics (i.e., coefficients selected expressly or inferentially prior to the reception of the load cell signals 51), computer program 100 determines the relative bend in each section of display device 12 to create a data model that corresponds to or describes the physical deformation, such as bend or contour properties, or characteristics, of display device 12 (116). The above operations may be executed one or more times. Repeated executions may be performed on a periodic basis, or may be performed upon detection of an event (such as a change in the load cell signals 51) or any combination thereof. According to one example embodiment, computer program 100 operates on a processing unit, such as that described with respect to FIG. 8, and is stored in a memory device or storage device in or off-board bend/view position processing system 54.

Figure 4:
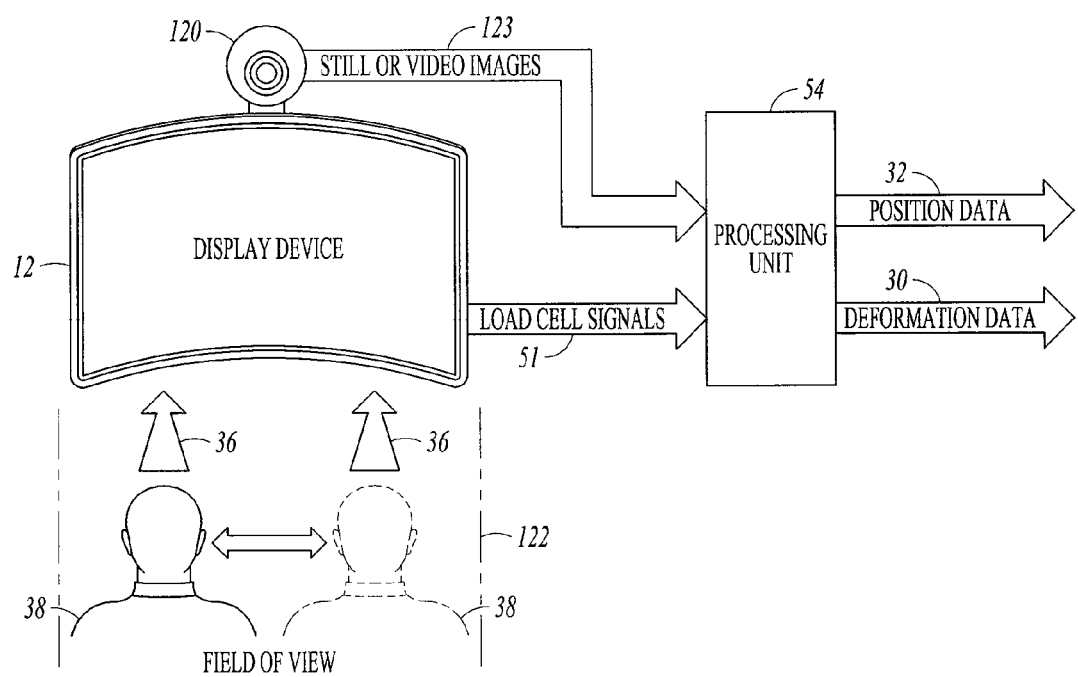
FIG. 4 schematically illustrates one example embodiment of head and eye tracking apparatus used to generate viewer position data or information, according to one example embodiment of the present technology.

Referring now to FIG. 4 there is schematically illustrated one example embodiment of a detector of a viewer's orientation, for example head and eye tracking apparatus, used to detect viewing orientation of a viewer and generate viewer position data. In general, the viewer position data is a function of the viewing orientation of a viewer 38 of the display device 12. A camera 120 (although only one camera is showing in FIG. 4, multiple cameras may be employed) is mounted either on, adjacent, or near display device 12. The camera 120 is an example of a detector of viewer orientation with respect to the display device 12. Other detectors of viewer orientation may be employed, including but not limited to infrared detectors, sonar detectors, or detectors that detect the viewer orientation as a function of specialized elements on a viewer (such as reflectors or emitters deployed unobtrusively or secretly on a viewer's body, a viewer's eyeglasses, or a viewer's jewelry, such that the detector responds to the orientation of the viewer but not to the orientation of other persons). According to one example embodiment, camera 120 is oriented so that its lens is directed pointing generally in a direction normal to the approximate plane of the display device 12 so that it encompasses a field of view 122 large enough to contain substantially all viewing perspectives 36 that may be assumed by a viewer 38 of the display device 12. According to one example embodiment, still or video images from camera device 120 are supplied to the bend/view position processing system 54. Optionally, head and/or eye tracking software operating in the bend/view position processing system 54, for example, may be used to track the position of a viewer's eyes and/or position of the viewer's head with respect to display device 12. The bend/view position processing system 54 receives viewer orientation detection information, which may for example be still or video image data 123 or electronic signals as a function of such images, from the camera 120 and generates viewer position data 32 as a function of the viewer orientation data 123. Generally speaking, the viewing position data 32, which is supplied to display control unit 14, encodes information from which the display control unit 14 can determine or estimate the viewer's approximate orientation, position or perspective 36 with respect to the display device 12. Further receiving signals 51 as a function of the deformation of the display device 12, the display control unit 14 can determine the kinds and degrees of distortion that may be experienced by the viewer 38. The display control unit 14 can further compensate for that distortion. According to another example embodiment, the bend/view processing system 54 may be implemented as separate systems, one serving to process the deformation detection signals, and the other to process the viewer orientation detection information or signals.

Figure 5:
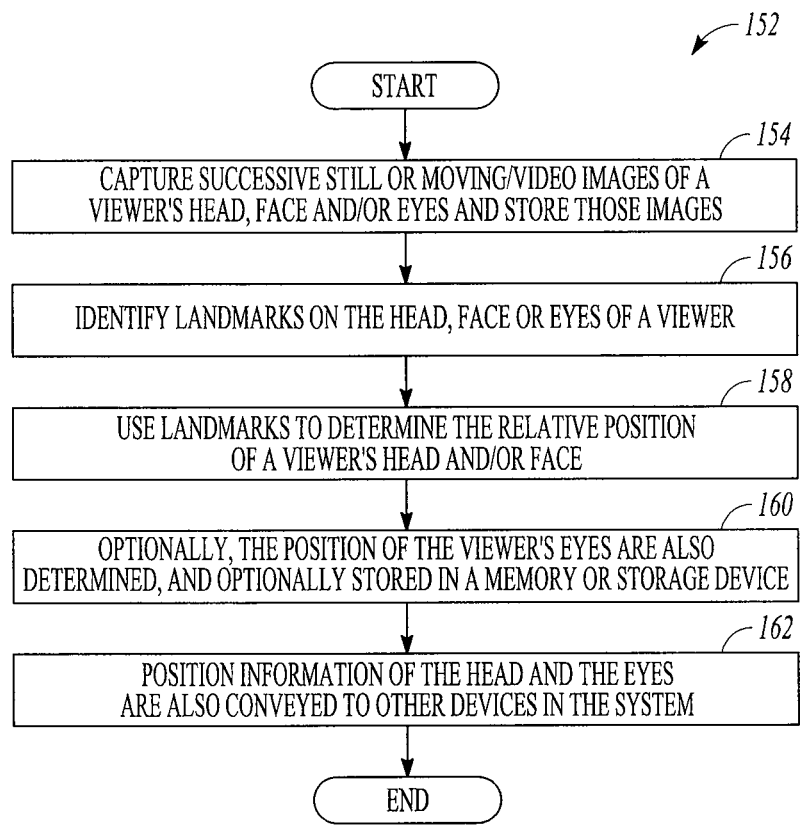
FIG. 5 is a flowchart illustrating a method and computer program to perform head and eye tracking functions and computations, according to one example embodiment of the present technology.

Referring now to FIG. 5, there is illustrated a flowchart of a method that, in one example embodiment, may be embodied as a computer program 152 operable on bend/view position processing system 54 in order to perform viewer orientation, position or perspective detection processes, for example head and eye tracking functions. According to one embodiment, program 152 operates bend/view position processing system 54 to capture successive still or moving/video images of a viewer's head, face and/or eyes and store those images (154). Program 152 processes the images in order to identify landmarks on the head, face or eyes of a viewer (156). Using predetermined or known or estimated characteristics of the field of view of the camera 120, the landmarks are then used to determine the relative position of a viewer's head and/or face (158). In addition, or in the alternative, the position, direction and/or gaze of the viewer or viewer's eyes are also determined (160) and optionally stored in a memory or storage device. The position information of the head and the eyes are also conveyed to other devices in the system (162), such as display control unit 14, either directly from bend/view position processing system 54 or from memory or storage. The above operations may be executed one or more times. In one optional variation, program 152 may be unable to identify any landmarks of a viewer. Under such circumstances, the program 152 may direct that the display device be turned off, switched to a low-power state, or that certain information on the display screen be dimmed or otherwise not displayed. An inability to identify landmarks of a viewer may be an indicator that there is no viewer in the proximity, so part or all of the display may be wholly or partly deactivated in the interests of conserving power or furthering security.

Figure 6:
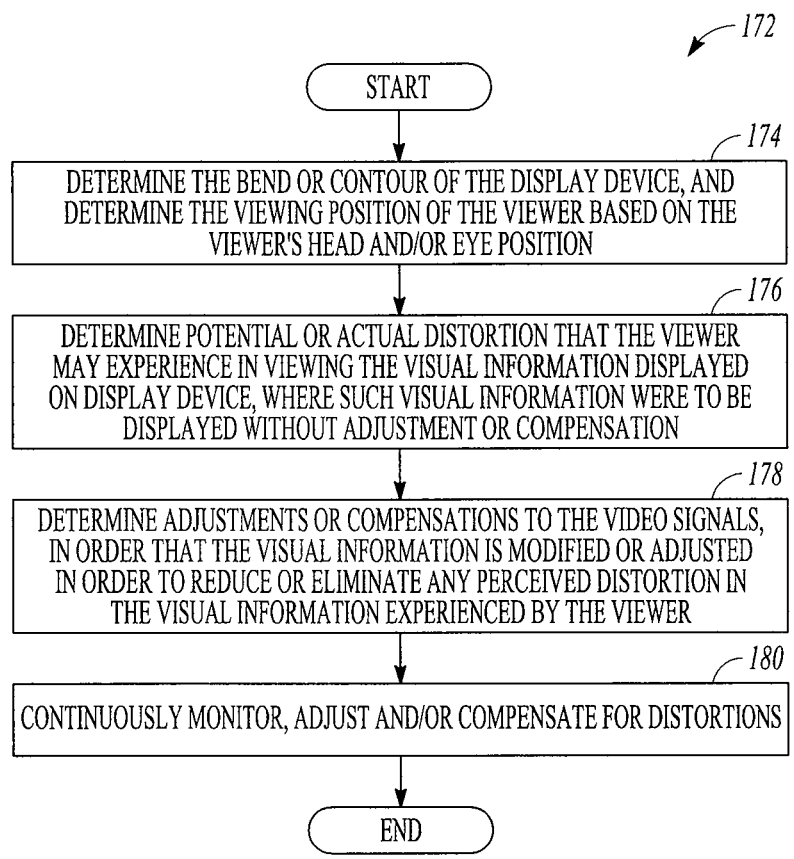
FIG. 6 is a flowchart illustrating a method and computer program to determine compensation for distortion in displayed information, according to one example embodiment of the present technology.

Referring now to FIG. 6, there is illustrated a flowchart of a method that, in one example embodiment, may be embodied as a computer program 172 and operable for example on display control unit 14. According to one example embodiment, computer program 172 operates to control the display of visual information on display device 12 in response to both the deformation data 30 and viewer position data 32. Program 172 is responsive to the data 30 and 32, received from the bend/view position processing system 54, to determine the bend or contour of the display device 12, and to determine the viewing position of the viewer based on the viewer's head and/or eye position (174). Using the data 30 and 32, computer program 172 determines the potential or actual distortion that the viewer may experience in viewing the visual information displayed on display device 12, where such visual information were to be displayed without adjustment or compensation (176). Based on the expected distortion, adjustments to the signals 20 are determined so that the image and/or visual information presented on display 12 is adjusted in order to reduce, improve or eliminate any perceived distortion in the visual information experienced by the viewer (178). According to one example embodiment, adjustments to signals 20 and/or the image and visual information may be made by adaptation, modification, compensation or by other means. Computer program 172 may continuously monitor and adjust and/or compensate for such distortions (180). In a variation, computer program 172 may monitor, adjust and/or compensate on a periodic basis or upon detection of an event (such as a change in the deformation of the display device 12 or the orientation of the viewer) or any combination thereof. According to still another example embodiment, the visual information presented is text, and distortions in the display of the text are compensated for, for example, in order to reduce illegibility of fonts, words, or paragraphs on the display device. Compensation for distortion may include, for example, stretching, narrowing, enlarging, shrinking, tilting, rotating, obliterating, replicating, interpolating or changing the color characteristics of visual information and/or image or part thereof. Alternatively, compensation for distortion may include, for example, moving the location in which visual information or a part thereof is displayed on the display device 12, or substituting alternative fonts for text, such as fonts specifically adapted to reduce distortion experienced from a particular viewing orientation. In general, compensation for distortion may reduce or eliminate one or more undesirable effects associated with the distortion. Any technique for distortion compensation may be applied. For example, display control unit 14 can mathematically determine the kinds and degrees of distortion that may be experienced by the viewer 38, as discussed above. By having data about the deformation of the display device 12 and the approximate location of the viewer 38 vis-à-vis the display device 12, ray-tracing or vector analysis may indicate whether the image of the visual information (e.g., text, graphics, video) is likely to appear distorted to the viewer. Further, because the content of an undistorted or less distorted image that ought to be perceived by viewer 38 is known (the undistorted or less distorted image may be encoded in the image data itself), techniques such as ray-tracing or vector analysis may be used to project the undistorted or less distorted image from the viewer 38 back to the display device 12. The output of the display device 12 may then be compensated or adjusted to display the visual information in such a way that an image that will appear undistorted or less distorted from the perspective 36 of a viewer 38. Notably, from a perspective other than that of the viewer 38, the output of the display device 12 may appear significantly distorted.

In still another example embodiment, the systems and methods of the present technology are adapted to control the display of visual information on display device 12 in response to both the deformation data 30 and viewer position data 32 not for the purpose of compensating for image distortion, but for the purpose of image enhancement, improvement or for creating special effects, without (or with) the presence of image distortion due to deformation of the display device. For example, in one embodiment, the method and/or computer program of FIG. 6 operates to adjust the control signals 20 in order to enhance or improve the visual information displayed in an image on display device 12. Such enhancement, improvement or special effects may include, for example, enhancing the visibility or readability of visual information such as text, video or graphics beyond its visibility or readability when displayed in an undistorted form. Such improvement or enhancement may be performed using any of the techniques described herein that are useful for reducing distortion, or using other techniques or methods.

According to one example embodiment, computer program 172 performs compensation adjustments based solely on the position, or approximate position, of the viewer's head and/or face, without taking into account the viewer's eye position. According to other example embodiments, the viewer's viewing angle, the position of the viewer's eyeballs, the position of the viewer's head, and the proximity of the viewer's head to the device are used to determine appropriate compensation of the visual information to be displayed on device 12. And according to still other example embodiments, only the position of the viewer's eyeballs and/or irises is used to determine the relative viewing position of the viewer. According to still another example embodiment, only the relative orientation of the viewer with respect to the display is determined such that the actual position distance from the display 12 of the viewer is not fully, or in another embodiment even partially, determined or supplied to computer program 172.

Figure 7A:
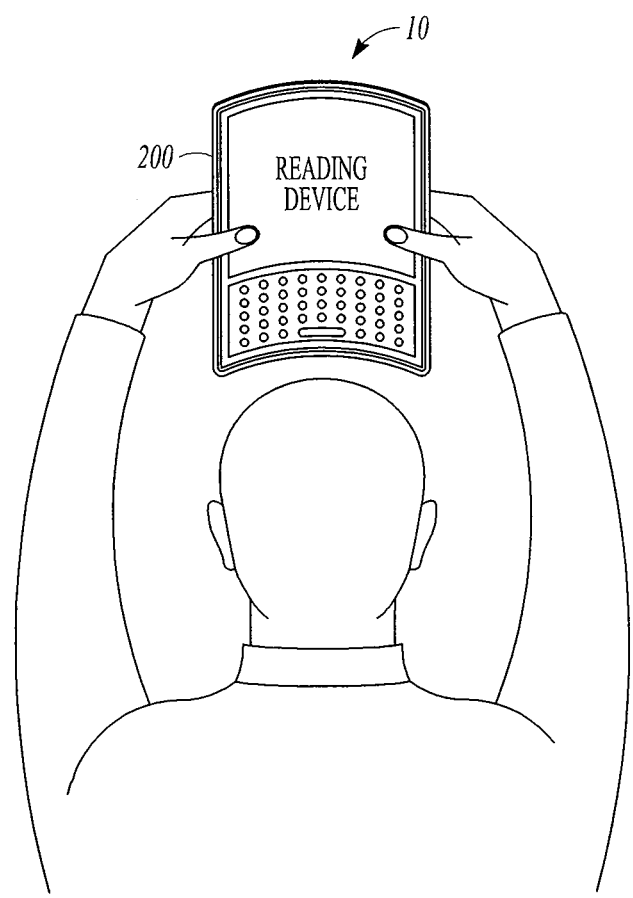
FIGS. 7A, 7B and 7C illustrate several example embodiments of devices incorporating a display system, according to the present technology.
Figure 7B:
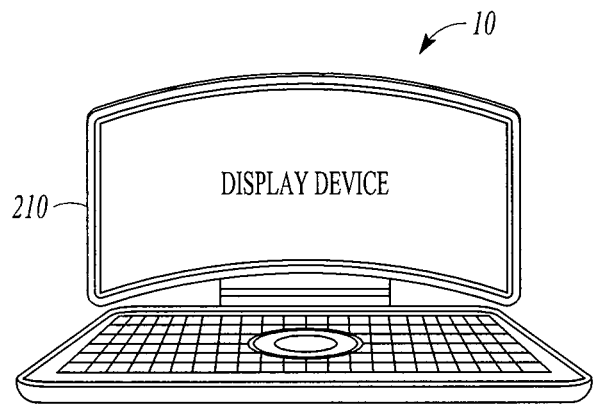
Figure 7C:
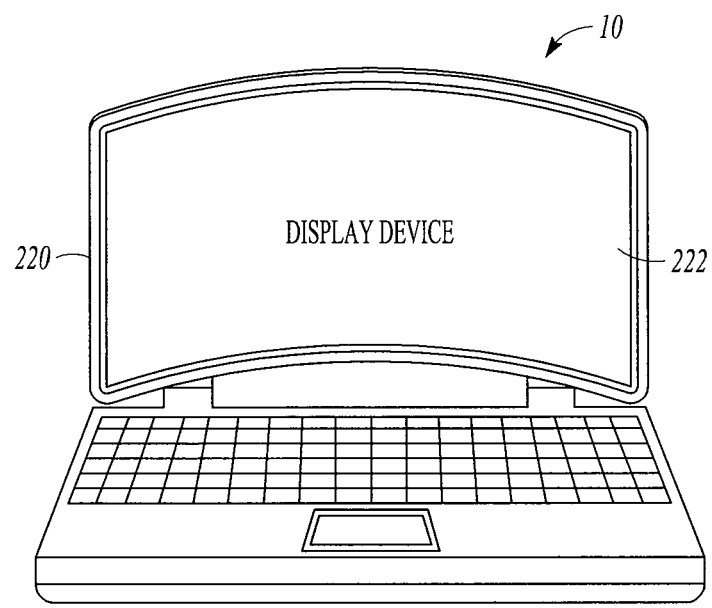

Referring now to FIGS. 7A, 7B and 7C, there is illustrated several example embodiments of devices incorporating display system 10. As illustrated in FIG. 7A, display system 10 may be incorporated in a reading device 200, which is a portable electronic device that may be held in a viewer's hands and have a form factor such as that illustrated. As illustrated in FIG. 7B, display system 10 may be incorporated in a handheld mobile device such as a mobile telephone and/or smart phone 210. As illustrated in FIG. 7C, system 10 may be used in a personal computing system 220 with a bendable display 222 allowing the viewer to bend the display, for example by curving in the outside ends of the display to create a quasi-three-dimensional viewing effect or to increase privacy in viewing the display in a crowded setting.

Figure 8:
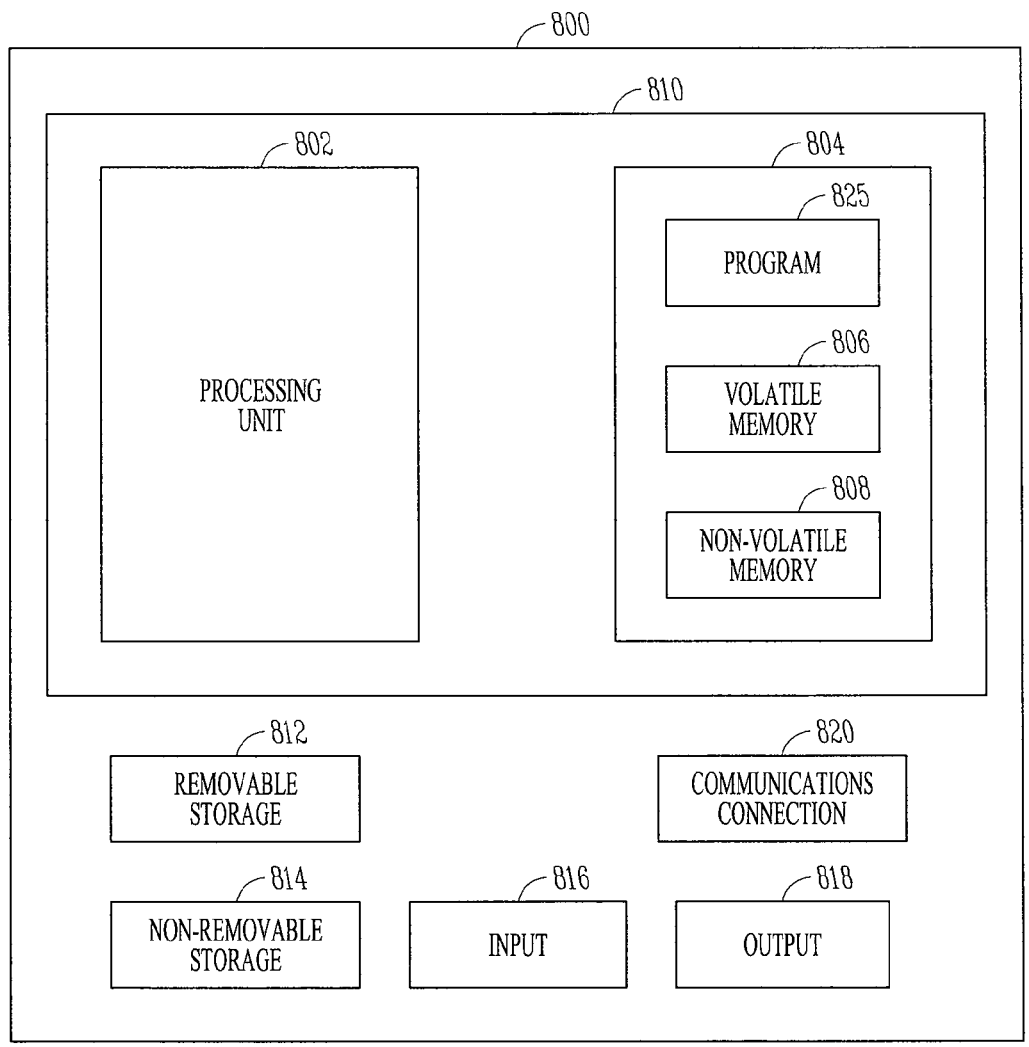
FIG. 8 illustrates in schematic form a computing platform suitable for use in certain example embodiments of the present technology.

Referring now to FIG. 8, there is illustrated in schematic form a computing platform 800 suitable for use in display unit 14 and/or bend/view position processing system 54, and for executing computer readable instructions, or computer program, 825, such as the computer programs described in FIGS. 3, 5 and 6, or otherwise implementing the methods and/or electronic functionality described herein. System 800, according to one example embodiment, includes a central processing unit circuit 810, which includes a processing unit 802, memory 804, removable memory storage 812 and non-removable storage 814. Memory 804 may include volatile memory 806 and non-volatile memory 808. System 800 may include or have access to a computer environment that includes a variety of computer readable media, such as volatile memory 806 and non-volatile memory 808, removable storage 812 and non-removable storage 814. Computer storage includes RAM, read-only memory (ROM), erasable programmable read-only memory (EPROM) and electrically erasable programmable read-only memory (EEPROM), flash memory or other memory technologies, compact disc read-only memory (CD-ROM), digital versatile discs (DVD) or other optical disc storage, magnetic cassettes, magnetic tape, magnetic disc storage or other magnetic storage devices, or any other tangible and physical medium capable of storing computer-readable instructions. System 800 may include or have access to a computing environment that includes input 816, output 818, and a communications connection 820. The system 800 may operate in a networked environment using a communications connection 820 to connect to one or more remote computers. The remote computers may include a personal computer (PC), server, router, network PC, a peer device or other common network node, or the like. The communication connection may include a local area network (LAN), a wide area network (WAN) and other networks. Computer-readable instructions 825 stored on a tangible and physical computer-readable medium in non-transitory form are executable by the processing unit 802 of the system 800. A hard drive, CD-ROM and RAM are some examples of articles including a computer-readable medium. For purposes of simplicity, the deformable display device 12 and the detector of viewer orientation (e.g., the camera 120) are not shown in FIG. 8. There may be, but need not be, a component-by-component mapping of schematically illustrated display system 10 in FIG. 1 with the illustrative schematic computing platform 800 in FIG. 8. For example, in some embodiments, the operations of bend/view position processing system 54 and display control unit 14 may be carried out by one or more computing platforms 800. In other embodiments, the operations of bend/view position processing system 54 or display control unit 14, or both, may be carried out by different elements, such as elements elsewhere in the computing environment that communicate with computing platform 800 via input 816, output 818, or communications connection 820.

Figure 9:
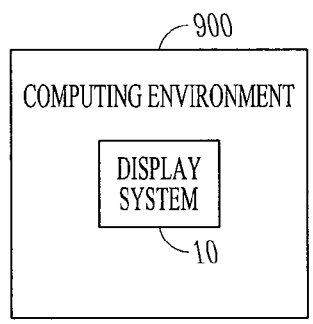
FIG. 9 illustrates the integration of a display system into a further computing environment.

As illustrated in FIG. 9, and as described above, display system 10 may be further integrated in a computer environment 900, wherein environment 900 utilizes display system 10 in order to display visual information requested by system 900 for display, for example, in response to a user or viewer selection of information or in response to a computer program executing on system 900. In one example embodiment, computing environment 900 includes a computing platform such as that described with respect to FIG. 8.

According to one example embodiment, the display device 12 may be a foldable, wrappable, moldable plastic display, for example, available from the Hewlett-Packard (HP) Corporation. According to another example embodiment, display device 12 might be a folding display, for example as available from Philips Corporation. According to another example embodiment, the bendable display may be obtained from Plastic Logic, Inc, for example, as used in their Plastic Reader device. According to various other example embodiments of the technology, the deformable or bendable display device 12 may be deformable along any line, location, or orientation of the display device 12, or only along predetermined lines, locations or contours. According to still another example embodiment, the visual information may include text, graphics or video. According to still other example embodiments, the display device 12 may operate using liquid crystal display, light emitting diodes or plasma display technologies. According to still other example embodiments, the display device 12 may include or be enabled for touch screen capabilities or to display three dimensional (3D) images or video.

According to still another example embodiment, depending on the position of the viewer, or the orientation of the viewer's eyes, the entire display system 10 and/or display 12 and/or display control unit 14 may be switched to a low or no power state, such as when no viewer is detected in the field of view or it is determined that the viewer is not looking at the display 12. In this example embodiment, computer program 172 further includes code in order to make such determination and to provide power control instructions or signals to the system or sub-components of the system.

According to still other example embodiments, the display control unit is a graphics processing unit (GPU) that is a specialized microprocessor system that offloads and accelerates 3D or 2D graphics rendering from a general purpose microprocessor system in which the display control unit 14 is used. According to another example embodiment, the display control unit 14 is integrated on the central processing unit of a general processing computer, or is deployed on a separate dedicated video card that may be installed in a slot of a personal computer or server system. According to still another example embodiment, the display control unit 14 is a hybrid of the above described solutions. In still other example embodiments, the display control unit 14 may use stream processing and general purpose GPUs.

Various embodiments of the concepts described herein may realize one or more advantages. A display system 10 for a bendable display may be improved, in that perceived distortions of visual information displayed to a viewer may be compensated for so that the viewer may experience the visual information more closely aligned with an undistorted appearance (i.e., the appearance of such visual information when displayed on a substantially planar or flat display with no bend). Further, the above described system contemplates dynamic and adaptive implementations, such that a change in the viewer perspective, or a change in the deformation of the display device, or both, can be detected. As a result of changes in viewer perspective or display device deformation, there may be more or less or different distortion, and compensation for that distortion may change automatically.

Notably, in some electronic devices, deformation of the display represents an input or a command to the device. For example, a viewer reading a page of text may bend the display to command the device to turn a virtual page. The techniques described herein may be advantageously applied to systems in which deformation of the display device represents an input or a command.

Further, one or more embodiments may support various security applications, including images that may be viewed intelligibly by a viewer from a particular perspective, but that may appear unintelligibly distorted from other perspectives. In addition, one or more embodiments may work in concert with security or power-saving applications (which are useful for battery-powered portable electronic devices, for example), such that when the perspective of a viewer is such that the viewer cannot see the display device at all, all or a portion of the display device is darkened or turned off.

In addition, the compensation for distortion may be activated or deactivated by a viewer, such that a viewer may prefer to see an image that is distorted. Such an image may be desirable when two viewers simultaneously view an image on a curved display device. Rather than making the image less distorted for one viewer, which may make the image more distorted for the other, compensation for the distortion may be deactivated so that the two viewers each experience some distortion of the image.

Another potential benefit is that the techniques described herein need not compensate for all distortion. In some embodiments, no compensation may be applied to minor distortions, but compensation may be applied to more significant distortions.

Having thus described the several embodiments of the present technology, it will be readily appreciated that other embodiments may be made and used which fall within the scope of the claims attached hereto. Numerous possible advantages of the technology covered by this document have been set forth in the foregoing description. It will be understood that this disclosure is, in many respects, only illustrative. Changes can be made with respect to various elements described herein without exceeding the scope of the claims appended hereto.

The invention claimed is:

1. A system comprising:
   a deformable display device to produce displayed visual information on the display device as a function of one or more image control signals; and
   a display control unit receiving image display data and producing the one or more image control signals,
   wherein the one or more image control signals change the appearance of the visual information from a first display format to a second display format, the second display format configured to provide a display of the same visual information provided in the first display format by using the deformation data, viewer position data, and the image display data,
   wherein the deformation data is a function of a deformation in the deformable display device and
   the viewer position data is a function of a proximity of a human viewer to the deformable display device and an orientation of the human viewer with respect to the deformable display device,
   wherein the one or more image control signals compensate for distortion that is experienced by the human viewer due to a current perspective of the human viewer resulting from a combination of the proximity of the human viewer to the deformable display device and the orientation of the human viewer relative to the deformable display device, and wherein the one or more image control signals compensate for distortion by at least substituting original fonts of text in the image display data with alternative fonts that present the text with reduced distortion relative to the original fonts.

2. The system according to claim 1 further including at least one processing system responsive to at least one deformation detection signal and viewer position information to produce the deformation data and the viewer position data.

3. The system according to claim 2, further including at least one camera to produce viewer position information.

4. The system according to claim 1, wherein the visual information comprises one or more of text, graphics, and video.

5. The system according to claim 1, wherein the display device and the display control unit are part of a machine that is a: personal computer, smart phone, mobile phone, laptop computer, notebook computer, reading device, or tablet computer.

6. The system according to claim 1, wherein the one or more image control signals enhance, improve or create a special effect in response to deformation in the display device and the proximity and the orientation of the human viewer.

7. The system according to claim 1, wherein the displayed visual information on the deformable display device appears distorted to a second human viewer, the second human viewer associated with second viewer position data that differs from the viewer position data associated with the human viewer.

8. The system according to claim 1, wherein the current perspective of the human viewer is based on eye position of the human viewer.

9. A system comprising:
a deformable display device to produce displayed visual information on the deformable display device as a function of one or more image control signals;
one or more deformation detection devices to produce a deformation detection signal indicative of deformation of the deformable display device;
a viewer position detector to produce viewer position information indicative of proximity of a human viewer to the deformable display device and an orientation of the human viewer with respect to the deformable display device; and
at least one processing system responsive to the deformation detection signals and the viewer position information to produce data used to adjust the one or more image control signals,
wherein at least one or more image control signals are adjusted to change the appearance of the visual information from a first display format to a second display format, the second display format configured to provide a display of the same visual information provided in the first display format,
wherein the one or more image control signals compensate for distortion that is experienced by the human viewer due to a current perspective of the human viewer resulting from a combination of the proximity of the human viewer to the deformable display device and the orientation of the human viewer relative to the deformable display device, and
wherein the one or more image control signals compensate for distortion by at least substituting original fonts of text in the first display format with alternative fonts that present the text with reduced distortion relative to the original fonts.

10. The system according to claim 9, wherein the deformation detection devices are load cells that produce the deformation detection signals.

11. The system according to claim 9, wherein the deformation detection device comprises a camera.

12. The system according to claim 9, wherein the deformation detection devices are adjacent to or in contact with the deformable display device.

13. The system according to claim 9, wherein the deformation detection signals specify, at least in part, bends or contours in the display device that are at least partially transverse to one another.

14. The system according to claim 9, wherein the viewer position detector comprises a camera.

15. The system according to claim 9, wherein the display device is part of a machine that is a: personal computer, smart phone, mobile phone, laptop computer, notebook computer, reading device, or tablet computer.

16. The system according to claim 9, wherein the at least one processing system receives the deformation detection signals and generates deformation data specifying deformation properties of the display device.

17. A method comprising:
detecting one or more deformations of a deformable display device, and representing the one or more deformations, at least in part, in deformation data;
detecting proximity of a human viewer to the deformable display device and an orientation of the human viewer with respect to the deformable display device, and representing the proximity and orientation of the human viewer, at least in part, in viewer position data; and
adjusting one or more image control signals to be applied to the deformable display device to produce visual information, the one or more image control signals being adjusted using the deformation data and the viewer position data,
wherein the one or more image control signals are adjusted to change the appearance of the visual information from a first display format to a second display format, the second display format configured to provide a display of the same visual information provided in the first display format, viewer position data, and the image display data,
wherein the one or more image control signals compensate for distortion that is experienced by the human viewer due to a current perspective of the human viewer resulting from a combination of the proximity of the human viewer and the orientation of the human viewer relative to the deformable display device, and
wherein the one or more image control signals compensate for distortion by at least substituting original fonts of text in the first display format with alternative fonts that present the text with reduced distortion relative to the original fonts.

18. The method according to claim 17, further comprising a viewer position detector that generates viewer position data as a function of the proximity and the orientation of the human viewer with respect to the deformable display device.

19. The method according to claim 18, wherein the viewer position detector comprises a camera.

20. The method according to claim 17, wherein the one or more image control signals compensate for distortion due to the deformation in the deformable display device and the proximity and the orientation of the human viewer.

21. The method according to claim 17, wherein the one or more image control signals are adjusted by altering image display data, wherein the one or more image control signals are a function of the image display data.

22. The method according to claim 17, wherein the one or more image control signals enhance, improve or create a special effect in response to deformation in the display device and the proximity and the orientation of the human viewer.

23. A computer program product comprising computer program instructions recorded in non-transitory form on a machine-readable media, the instructions adapted to execute on a computer to:

receive one or more signals or data indicative of the deformation of a deformable display device, and produce deformation data representing the deformation of the display device;

receive data indicating proximity of the deformable display device to a human viewer of the deformable display device and orientation of the human viewer relative to the deformable display device;

encode data indicating the proximity and the orientation of the human viewer relative to the deformable display device, at least in part, in viewer position data; and generate adjustments to one or more image control signals to be applied to the deformable display device, wherein the one or more image control signals change the appearance of the visual information from a first display format to a second display format, the second display format configured to provide a display of the same visual information provided in the first display format by using the deformation data, and the viewer position data wherein the one or more image control signals compensate for distortion that is experienced by the human viewer due to a current perspective of the human viewer resulting from a combination of the proximity of the human viewer and the orientation of the human viewer, and wherein the one or more image control signals compensate for distortion by at least substituting original fonts of text in the first display format with alternative fonts that present the text with reduced distortion relative to the original fonts.

* * * * *